Dec. 13, 1927.
W. H. MULLOY
1,652,872
SAFETY FENDER FOR AUTOMOBILES
Filed April 21, 1927
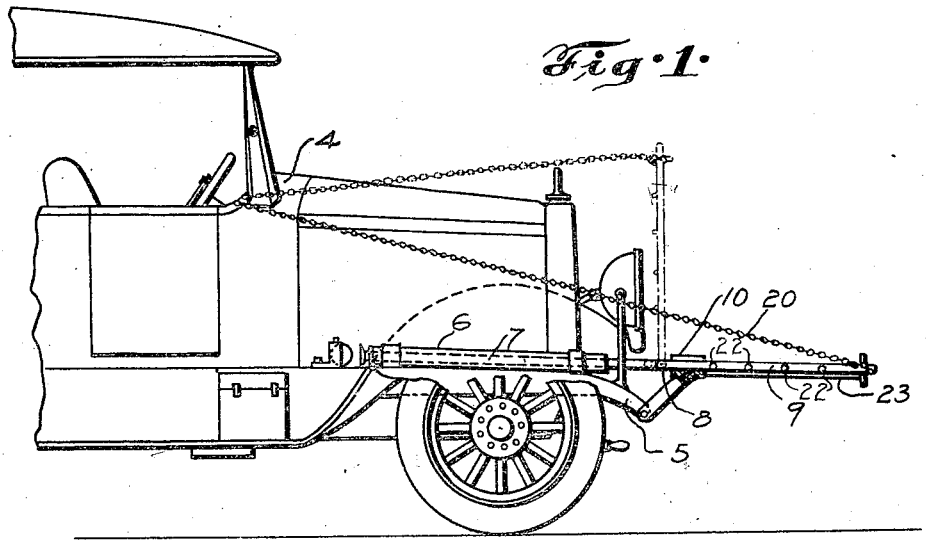
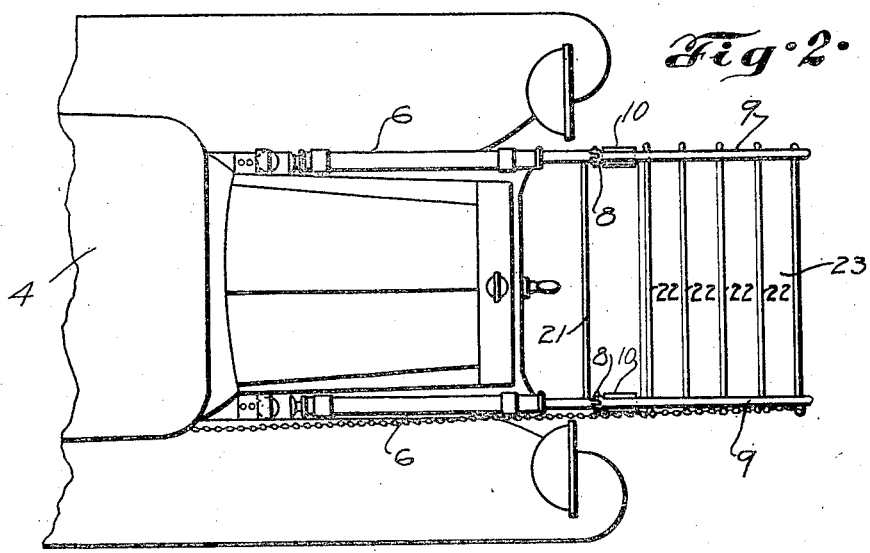
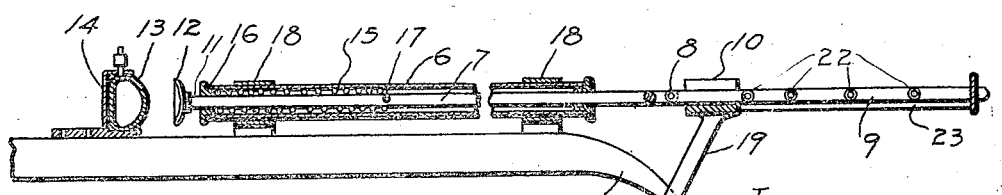
INVENTOR
William H. Mulloy Patented Dec. 13, 1927.

1,652,872

UNITED STATES PATENT OFFICE.

WILLIAM H. MULLOY, OF ST. LOUIS, MISSOURI.

SAFETY FENDER FOR AUTOMOBILES.

Application filed April 21, 1927. Serial No. 185,575.

My invention relates to a safety fender for automobiles where an adjustable safety fender is used in conjunction with a shock absorbing device. The primary object of the fender is to provide a safety fender attached to and in front of the shock absorbing device and so arranged that the safety fender may be raised or lowered from a horizontal to a vertical position. A further object is to construct the safety fender so that it may be used as a windshield for the radiator, if desired, or as a guard for the radiator or as a safety fender to catch pedestrians if struck.

I am aware that different shock absorbing devices are in use and also that my safety fender may be attached to different ones but as a matter of explanation I have chosen the shock absorbing device illustrated and explained in Letters Patent 1,506,989, dated Sept. 2, 1924, and issued to William H. Mulloy of St. Louis, Missouri, being the same Mulloy who applies for this patent.

Fig. 1 is a fragmental side view of an automobile with my fender attached to the shock absorbing device, showing fender in both horizontal and vertical position.

Fig. 2 is a top plan view of the same.

Fig. 3 is an enlarged longitudinal section of one of the side members showing the means of taking up shocks and one of the side members of my fender attached thereto.

Similar numerals refer to similar parts throughout the several views. In the construction of my device I make use of the automobile 4, which is provided with the usual chassis frame 5. Secured to this frame and on either side of the hood are hollow members 6, through which rods 7 extend, and pivoted to this rod at 8 is the rod 9 that rests in the open bearing 10. Secured at the end 11 of the rod 7 is a disk 12, which is designed to come in contact with a pneumatic bumper 13, which is carried by a bracket 14, and the bracket is secured to the chassis frame. Within the hollow member 6 and surrounding the rod 7 is a coil spring 15 that rests at one end against a sleeve plug 16, and the other end is in contact with a pin 17 carried by the rod 7. The tubes 6 are secured to the chassis by means of the loops 18. Secured to the front of the chassis frame is a bracket 19, which is provided on its free end with an open top bearing 10, through which the rod 9 passes, and from which the rod 9 may be raised to a vertical position, by means of a chain 20, which chain is secured to a bolt in the outer end of the rod 9, and said chain extends into the automobile 4, where it may be secured in any manner within the reach of the driver, and by means of the chain the fender may be raised or lowered. Extending between and attached to rods 8 is rod 21.

Secured to rods 8 by means of pivots are rods 9 and extending between and secured to rods 9 are a plurality of rods 22. The rods 9 and the plurality of rods 22 constitute the frame work of my safety fender. Underneath the cross rods 22 and attached thereto, by means of machine screws or any practical removable means, is a plate 23, extending between the members 9. The purpose of this plate is to provide a windshield for the radiator of the car when the fender is carried in a vertical position, thereby keeping the cooling system at a higher temperature during cold weather. The said windshield plate is made removable so that during the summer months the plate may be removed thus providing no shield to divert air from the cooling system, and the cross rods will furnish a protection for the radiator against injury. In case the driver anticipates striking a pedestrian he may drop the safety fender to a horizontal position, by releasing the chain, and it will serve as a safety catch for the pedestrian to fall on if struck.

Having fully described my invention, what I claim is:—

A safety fender for automobiles having side members in combination with a shock absorbing device having side members, said side members of the safety fender being pivoted to the side members of the shock absorbing device and the side members of the safety fender connected across by a plurality of cross members and said safety fender provided with a removable plate that may be attached to the said cross members and a means of raising said safety fender from a horizontal to a vertical position, all substantially as set forth.

In testimony whereof, I have signed my name to this specification.

WILLIAM H. MULLOY.